3,412,599
SPECTRAL ATTENUATION HYGROMETER
Carl A. Hammons, Raymond R. Smith, and David B. Witter, Pomona, Calif., assignors to General Dynamics Corporation, a corporation of Delaware
Filed May 16, 1966, Ser. No. 550,211
10 Claims. (Cl. 73—17)

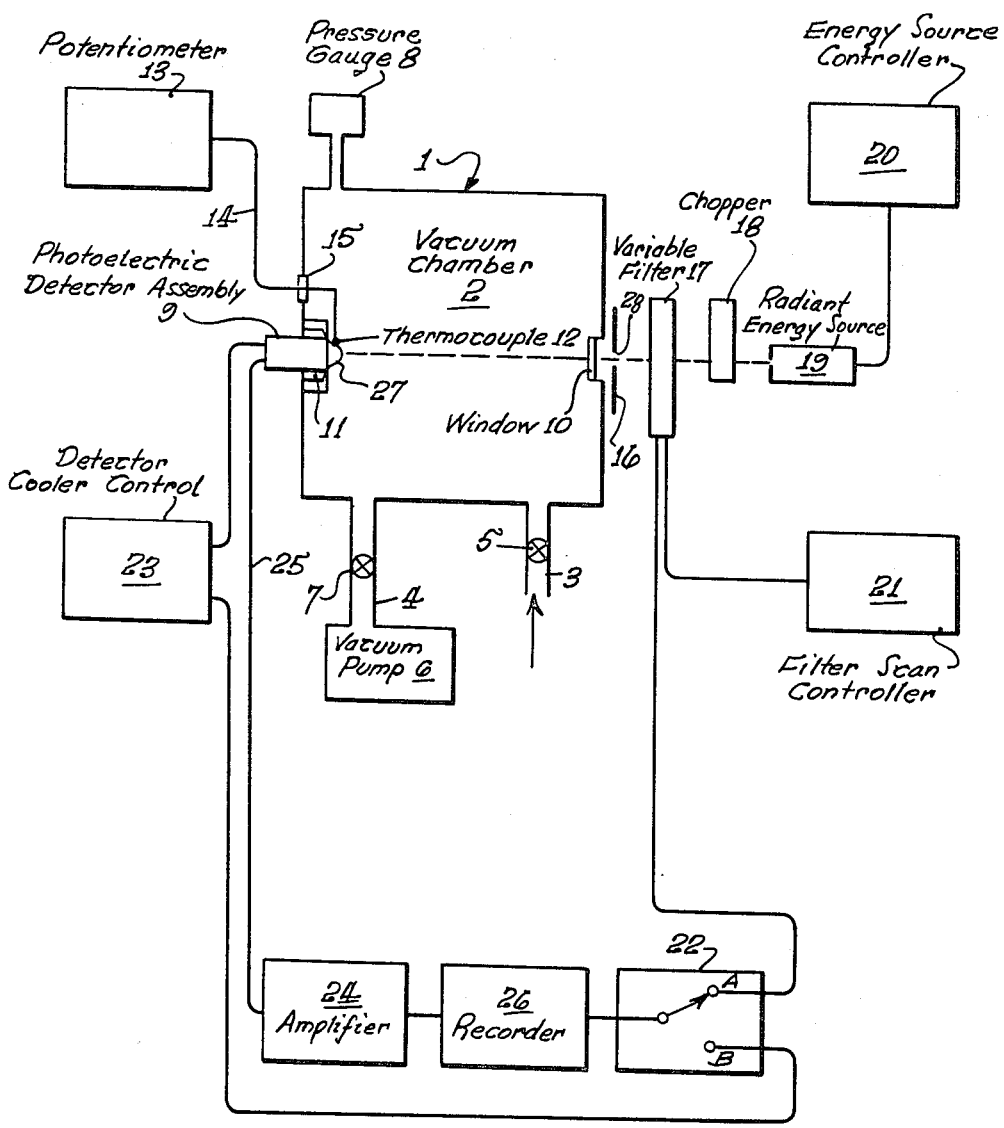

ABSTRACT OF THE DISCLOSURE

A dewpoint measuring apparatus having a chamber, a radiant energy source for projecting energy into the chamber, a detector lens for detecting a change in energy and monitoring temperature, means to cool the lens and filter means to allow only energy in a desired wavelength to pass into the chamber.

---

This invention relates to apparatus for measuring the dewpoint of a gas or mixture of gases, and particularly to apparatus for measuring dewpoints by means of radiant energy transmitted via a variable wavelength filter.

It is well known that the dewpoint is the temperature at which a condensable vapor will condense out of its atmosphere. The measurement of the dewpoint is often extremely important as it gives an indication of the amount of condensable vapor presently in a given atmosphere.

There have been a number of proposed devices for automatically measuring the dewpoint. Most of these prior art devices utilize the reduction in specular reflectivity of a mirror on which vapor condensed in order to determine when the dewpoint had been reached. Such prior devices are exemplified by U.S. Patents 3,166,928 and 3,195,345. Other prior known devices have utilized radiant energy conducting members which rely on the changes in conductivity of light therethrough as illustrated by U.S. Patent 3,050,982.

The present invention utilizes a radiant energy sensitive means which receives radiant energy through a variable wave-length filter. The filter greatly increases the sensitivity of measurement and also allows identification of various gases in a mixture and measurement of their dewpoint.

Therefore, it is an object of this invention to provide a new and improved apparatus for measuring the dewpoint.

A further object of the invention is the provision of an apparatus for measuring the dewpoint of a gas or a mixture of gases.

Another object of the invention is to provide an apparatus which provides very rapid determination of dewpoint as well as different dewpoints of the same gaseous mixture.

Another object of the invention is to provide a dewpoint determination apparatus which does not require continuous flow of the gaseous media through the system.

Another object of the invention is to provide a dewpoint determination apparatus which incorporates a variable wavelength filter which increases the sensitivity of measurement and allows identification of various gases in a mixture and measurement of their dewpoints.

Other objects of the invention, not specifically set forth, will become readily apparent from the following description and accompanying drawing wherein:

The single figure schematically illustrates an embodiment of the invention.

Broadly, the present invention is directed to a test apparatus for determining the dewpoint of a gas or mixture of gases. More particularly, the inventive apparatus, as illustrated, includes an evacuated chamber having a photoelectric detector assembly and a sapphire window placed in opposite walls, means for controlling the temperature of the detector assembly, means for continuously monitoring the temperature of the detector lens, means for amplifying and recording electrical outputs of the detector, a radiant energy source, a chopper, and a varibale wavelength filter whereby modulated radiant energy at the absorption wavelength of the gas whose dewpoint is to be determined is passed through the chamber to the detector assembly whose electrical output is attenuated at the dewpoint of the test vapor by frost forming on the detector lens. The filter greatly increases the sensitivity of measurement and provides identification of various gases in a mixture and measurement of their dewpoint.

Referring now to the drawing, the apparatus, as illustrated, comprises housing 1 defining an evacuation chamber 2, the housing being provided with a fluid inlet 3 and a vacuum connection 4. Fluid inlet 3 is provided with a metering valve 5, while vacuum connection 4 is connected to a vacuum pump 6 and is provided with an evacuation valve 7. A pressure gauge 8 is operatively connected to the housing chamber 2. Positioned in one wall of housing 1 is a photoelectric detector assembly 9 while a sapphire window 10 is mounted in the housing directly opposite to the detector assembly 9. The photoelectric detector assembly is provided with an insulating sleeve 11 and a temperature sensing element such as a thermocouple 12. The thermocouple 12 is connected to a temperature readout device such as a potentiometer 13 via a lead 14 which extends through a seal 15 in housing 1.

Positioned in alignment with detector assembly 9 and window 10 is an apertured element 16, a variable wavelength filter 17, a chopper 18 and a radiant energy source 19. A temperature controller 20 is operatively connected to energy source 19. Operatively connected with the variable wavelength filter 17 is a filter scan control 21 and an X-axis selector switch 22.

Connected to cooler section (not shown) of photoelectric detector assembly 9 is a cooler control 23, while a signal amplifier 24 is electrically connected to the signal lead 25 of assembly 9. The signal from amplifier 24 is utilized to deflect the indicating element (not shown) of recorder 26, while recorder 26 and cooler control 23 are each operatively connected to switch 22 for purposes to be described hereinafter.

The photoelectric detector assembly 9 is prepared for use by installing the insulating sleeve 11, attaching thermocouple 12, and connecting the cooler section thereof to the cooler control 23, and the detector signal lead 25 to amplifier 24. The insulating sleeve 11 encloses the detector support post (not shown) and touches the post just behind the lens 27 with a knife edge contact. The sleeve 11 prevents the molecules composing the chamber atmosphere from condensing on the cold detector post and assures that they condense only on the detector lense 27. The thermocouple 12 provides a means of monitoring the detector lens temperature and is attached at the rear of the lens so it will not intercept any of the energy illuminating the detector 9. The thus assembled detector assembly 9 is then inserted into housing 1 and retained and sealed therein by conventional means.

To prepare the chamber 2 of housing 1 for use, metering valve 5 is closed, vacuum pump 6 is energized and vacuum valve 7 is opened, thereby evacuating the chamber. Pressure gauge 8 is energized and the pressure monitored. The chamber 2 is evacuated in this manner until outgassing of the chamber and its accessories is completed. Termination of outgassing is accomplished when gauge 8 indicates a pressure of approximately $4 \times 10^{-6}$ mm. Hg, for example. When the outgassing phase is completed, vacuum valve 7 is closed and the pump 6 inactivated. The chamber pressure will slowly increase but should not rise, for this example, to more than $4 \times 10^{-6}$ mm. Hg in five (5) minutes. If the pressure increases greater than this amount in the itme period, outgassing must be continued and any leaks eliminated.

Apertured member 16 is positioned over the optical centerline of the chamber 2 and the size of the aperture 28 therein is adjusted to prevent infrared energy from reflecting from the chamber walls and causing erroneous detector output signals.

With the photoelectric detector assembly 9 installed into the housing 1 and after completion of outgassing of the chamber 2, as described above, the system is placed into operation by the following procedure.

The following elements are energized: potentiometer 13, vacuum pump 6, amplifier 24, recorder 26, filter scan control 21, radiant energy source 19 and its associated temperature controller 20, and chopper 18. The X-axis selector switch 22 is set to position A so that the indicator pen of recorder 26 can traverse the required horizontal distance as the variable filter 17 rotates through a complete wavelength scan. The gas or mixture whose dewpoint is to be determined is connected to inlet 3 for control by metering valve 5.

After assuring that the metering valve 5 is closed, evacuation valve 7 is opened and the chamber 2 is evacuated until pressure gauge 13 indicates the desired pressure, as exemplified above. When this pressure is attained, the evacuation valve 7 is closed and the pressure gauge 8 is monitored until the chamber pressure has stabilized. The detector cooler control 23 is energized and the temperature of the detector 9 lowered to $-100°$ C., for example, as indicated by the potentiometer 13. The indicator pen of the recorder 26 is lowered onto the paper of the recorder and a graph showing a complete wavelength scan is made, and the pen again raised. This procedure provides a graph of the system response with no gas within the chamber 2.

The temperature of the detector assembly 9 is raised to room temperature by setting control 23 to "Off." The evacuation valve 7 is opened and the chamber pressure allowed to stabilize, then metering valve 5 is opened admitting the gas whose dewpoint is to be measured into chamber 2. The amount of gas admitted is determined by monitoring the pressure gauge 8 and allowing the chamber pressure to increase to between 0.010 and 0.020 mm. Hg, for example, and valves 7 and 5 are simultaneously closed. With the unknown gas in the chamber 2 radiant energy generated by the source 19 passes through the chopper 18, where it is modulated, to the variable wavelength filter 17 which controls the spectrum of the energy, through the sapphire window 10, and illuminates the photoelectric detector assembly 9. The temperature of the detector assembly is then lowered, by cooler control 23 being set to "On." The X-axis switch 22 is set to position A which causes the recorder pen to de deflected as a function of filter wavelength. The indicator pen of recorder 26 is lowered on the graph paper, and using controller 21 a complete wavelength scan is recorded. This record will indicate absorption spectra of the components of the gas which has condensed on the lens 27 of the detector assembly 9. This test is thus terminated and the dewpoint of a specific component of the gas will next be determined as described below.

The variable wavelength filter 17 is adjusted by controller 21 to pass only the absorption wavelength of the vapor whose dewpoint is to be determined. For example, the absorption wavelength of water is 3.1 microns and if it is desired to determine the dewpoint of the water vapor of the gas the variable filter 17 is adjusted to pass a narrow spectrum of energy centered at 3.1 microns. The radiant energy striking the detector assembly 9 causes an electrical output signal to be developed. The X-axis switch 22 is set to position B which causes the recorder pen to be deflected as a function of the detector assembly temperature. The amplitude of this signal is increased by the amplifier 24 and used to deflect the indicating pen of the recorder 26. The temperature of the detector assembly is then lowered, by cooler control 23 being set to "On," until the vapor condenses in the form of condensation or frost on the lens 27. The indicator pen of the recorder 26 is again lowered onto the graph paper, and using controller 21 a complete temperature scan is recorded. The frost on lens 27 causes an attenuation of the energy reaching the detector 9 and reduces the electrical signal output as recorded by the recorder. The temperature of the detector assembly is continuously monitored by the thermocouple element 12 and its associated potentiometer 13. At the first indication of attenuation of the detector signal, the temperature of the detector assembly, as indicated by the potentiometer, is noted. This temperature is the dewpoint of the vapor whose absorption wavelength is the same as the wavelength of energy passed by the variable wavelength filter 17.

If the dewpoint of other condensible components of the gas or gaseous mixture is desired the variable filter 17 is adjusted by scan controller 21 to pass a narrow spectrum of energy centered at the absorption wavelength of the component desired and the above procedure repeated at the new wavelength.

It is within the scope of this invention to modify the illustrated embodiment by connecting the contact B of switch 22 to potentiometer 13 instead of to cooler control 23, as shown, and with graph paper marked by temperature degrees, a direct read could be made off the graph instead of coordinating the attenuation point with the potentiometer, as described above.

The above described apparatus has the following advantages over prior known devices:

(1) The measurement of dewpoint is independent of the pressure of the sample gas, for example, between $10^{-4}$ mm. Hg and 1000 mm. Hg, and independent of temperature between 160° F. and the condensation temperature of the component whose dewpoint is desired.

(2) It provides very rapid determination of dewpoint and widely different dewpoints of different components within a gas or mixture within a relatively short time period, for example, five minutes.

(3) It does not require a continuous flow of the sample gas through the apparatus, thereby affording considerable economy of operation.

(4) It is very sensitive to low concentration of vapor, being able to indicate dewpoints to at least $-110°$ C.

The above advantages being due primarily to the incorporation of the variable wavelength filter, which, as set forth above, greatly increases the sensitivity of measurement and provides identification of various gases in a mixture and measurement of their dewpoint.

Although a particular embodiment of the invention has been illustrated and described, modifications and changes will become apparent to those skilled in the art, and it is intended to cover in the appended claims, all such modifications as come within the true spirit and scope of the invention.

What we claim is:

1. An apparatus for determining the dewpoint of a gaseous media comprising: a housing defining a chamber, a radiant energy sensing means mounted in said housing, a window means constructed of suitable material positioned in said housing, means for controlling the temperature of said energy sensing means, means for monitoring the temperature of said energy sensing means, a radiant energy source, chopping means for modulating said radiant energy, associated energy from said source being adapted to be directed through said window means to impinge on said sensing means, a variable wavelength filter means positioned intermediate said energy source and said window, means for amplifying output signals from said energy sensing means, means for recording said amplified signals, means for evacuating said chamber, means for admitting media to be tested into said chamber, and switch means operatively connected to said recording means and to said filter means and temperature controlling means, whereby the absorption spectra of the components of the associated media may be determined, and whereby said filter means may pass radiant energy at the absorption wavelength of the associated media whose dewpoint is to be determined through the chamber to the sensing means whose electrical output is attenuated at the dewpoint of the vapor by condensation forming on the sensing means.

2. The apparatus defined in claim 1, additionally including means for monitoring the pressure in said chamber.

3. The apparatus defined in claim 1, additionally including means for controlling said radiant energy source.

4. The apparatus defined in claim 1, additionally including means for controlling the scan of said variable wavelength filter means.

5. The apparatus defined in claim 1, additionally including an apertured means configured to prevent the radiant energy from reflecting from the chamber walls and causing erroneous energy sensing means output signals.

6. The apparatus defined in claim 1, wherein said radiant energy sensing means comprises of photoelectric detector assembly.

7. The apparatus defined in claim 6, wherein said detector assembly includes a lens member and an insulating sleeve which causes the molecules composing the chamber atmosphere to condense only on the lens member.

8. The apparatus defined in claim 1, wherein said temperature monitoring means includes a thermocouple and a potentiometer.

9. The apparatus defined in claim 8, wherein said radiant energy sensing means includes a lens, and wherein said thermocouple is attached at the rear of said lens to prevent any interception of the energy illuminating the sensing means.

10. The apparatus defined in claim 1, wherein said window means is constructed of sapphire.

References Cited
UNITED STATES PATENTS

| | | | |
|---|---|---|---|
| 2,829,363 | 5/1955 | Obermaier et al. | 340—228 |
| 2,938,423 | 6/1956 | Rich | 88—14 |
| 3,050,982 | 5/1958 | Vollmer et al. | 73—17 |
| 3,216,257 | 11/1965 | Ford | 73—355 |
| 3,252,319 | 5/1966 | Wood et al. | 73—17 |

JAMES J. GILL, *Primary Examiner.*

EDDY E. SCOTT, *Assistant Examiner.*